US009768665B2

(12) United States Patent
Turner (10) Patent No.: US 9,768,665 B2
(45) Date of Patent: Sep. 19, 2017

(54) SYSTEM FOR PROVIDING ELECTRICAL POWER (71) Applicant: John Henry Turner, Retford (GB)

(72) Inventor: John Henry Turner, Retford (GB)

(*) Notice: Subject to any disclaimer, the term of this patent is extended or adjusted under 35 U.S.C. 154(b) by 0 days.

(21) Appl. No.: 15/031,551

(22) PCT Filed: Oct. 23, 2014

(86) PCT No.: PCT/GB2014/053168
§ 371 (c)(1),
(2) Date: Apr. 22, 2016

(87) PCT Pub. No.: WO2015/059484
PCT Pub. Date: Apr. 30, 2015

(65) Prior Publication Data
US 2016/0248301 A1 Aug. 25, 2016

(30) Foreign Application Priority Data

Oct. 25, 2013 (GB) .................................. 1318871.9

(51) Int. Cl.
*H02K 7/00* (2006.01)
*H02K 7/18* (2006.01)
(Continued)

(52) U.S. Cl.
CPC .............. *H02K 7/1853* (2013.01); *F03D 9/25* (2016.05); *F03G 7/08* (2013.01); *H02K 47/20* (2013.01);
(Continued)

(58) Field of Classification Search
CPC ....................................................... H02K 7/00
(Continued)

(56) References Cited

U.S. PATENT DOCUMENTS 2,137,990 A * 11/1938 Rossman ............... H02K 47/20
363/174
2,688,704 A * 9/1954 Christenson ............. H02J 9/08
290/4 C
(Continued)

FOREIGN PATENT DOCUMENTS

GB 2 483 866 A 3/2012
GB 2 487 680 A 8/2012
(Continued)

OTHER PUBLICATIONS

International Search Report for corresponding International Patent Application No. PCT/GB2014/053168 mailed Jul. 14, 2015.
(Continued)

*Primary Examiner* — Tho D Ta
(74) *Attorney, Agent, or Firm* — Merchant & Gould P.C.

(57) ABSTRACT

A system for providing electrical power to a facility includes a generator configured to generate electrical power for the facility when a drive-shaft of the generator is rotated. A motor is configured to provide torque to rotate the generator drive-shaft and to be driven by a first power supply. A mechanical energy provider is configured to provide torque to the drive-shaft using mechanical energy generated from an intermittent local power source. The system is configured to defer to the mechanical energy provider to rotate the drive-shaft such that, when the intermittent local power source is active, less power is needed from the first power supply to power the motor than when the intermittent local power source is inactive.

16 Claims, 4 Drawing Sheets (51) Int. Cl.
*F03G 7/08* (2006.01)
*F03D 9/25* (2016.01)
*H02K 47/20* (2006.01)

(52) U.S. Cl.
CPC ..... *F05B 2220/30* (2013.01); *F05B 2220/706* (2013.01); *Y02B 10/30* (2013.01); *Y02E 10/725* (2013.01)

(58) Field of Classification Search
USPC ........................................................ 290/1 R
See application file for complete search history.

(56) References Cited

U.S. PATENT DOCUMENTS

| | | | |
|---|---|---|---|
| 4,406,950 A * | 9/1983 | Roesel, Jr. .............. | H02J 9/066 290/4 C |
| 4,556,801 A | 12/1985 | Gervasio et al. | |
| 4,572,961 A * | 2/1986 | Borger ................ | H02P 29/0016 290/1 R |
| 4,721,861 A * | 1/1988 | Saito ...................... | G05D 17/02 290/4 C |
| 5,476,293 A | 12/1995 | Yang | |
| 5,624,347 A * | 4/1997 | Yang ........................ | B60K 1/02 180/65.225 |
| 6,097,104 A * | 8/2000 | Russell .................... | F03D 9/008 290/1 R |
| 6,998,723 B2 * | 2/2006 | Kong .................... | H02K 7/1807 290/1 C |
| 8,415,817 B2 * | 4/2013 | Thisted ................... | F03D 9/003 290/44 |
| 2008/0150295 A1* | 6/2008 | Fein ........................ | B60K 16/00 290/1 R |
| 2008/0224477 A1 | 9/2008 | Kenny | |

FOREIGN PATENT DOCUMENTS

| | | |
|---|---|---|
| GB | 2 490 908 A | 11/2012 |
| WO | 2010/083590 A1 | 7/2010 |

OTHER PUBLICATIONS

United Kingdom Search Report for corresponding United Kingdom Patent Application No. 1318871.9 mailed Dec. 20, 2013, 2 pgs.

* cited by examiner

DETAIL A
FIGURE 4b

SYSTEM FOR PROVIDING ELECTRICAL POWER

This application is a National Stage Application of PCT/GB2014/053168, filed 23 Oct. 2014, which claims benefit of 1318871.9, filed 25 Oct. 2013 in Great Britain and which applications are incorporated herein by reference. To the extent appropriate, a claim of priority is made to each of the above disclosed applications.

TECHNICAL FIELD

The present disclosure relates to the field of electrical energy provision.

BACKGROUND

Many facilities (e.g. a home, a small business or community) now generate electricity to meet their own needs, as alternatives or supplements to traditional centralized grid-connected power. This may be motivated by practical considerations (e.g. as the electricity may be cheaper to produce locally), or by environmental concerns (e.g. to lower carbon emissions). Facilities may use, for example, solar power or wind power.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

According to a first aspect, there is provided a system for providing electrical power to a facility, the system comprising:
a generator configured to generate electrical power for the facility when a drive-shaft of the generator is rotated;
a motor configured to provide torque to rotate the generator drive-shaft, the motor configured to be driven by a first power supply; and
a mechanical energy provider, configured to provide torque to the drive-shaft using mechanical energy generated from an intermittent local power source, and wherein the system is configured to defer to the mechanical energy provider to rotate the drive-shaft such that, when the intermittent local power source is active, less power is needed from the first power supply to power the motor than when the local power source is inactive.

The first power supply may be an electrical power supply.

The first power supply may be a mains electrical power supply.

The motor may be a combustible fuel motor. For example, the combustible fuel motor may comprise an internal combustion engine. The motor may be a constant speed synchronous motor.

At least one of the motor and the mechanical energy provider may be connected to the drive-shaft by a one-way clutch mechanism,
each said one-way clutch mechanism being configured:
to enable the respective motor and mechanical energy provider to rotate the generator drive-shaft in a driving direction, and
to inhibit the respective motor and mechanical energy provider from being driven by the drive-shaft when the drive-shaft is being rotated by the other of the mechanical energy provider and motor in the driving direction.

For example, if the motor was driving the shaft in the driving direction, a one-way clutch mechanism may be used to prevent the shaft also driving the mechanical energy provider. Similarly, if the mechanical energy provider was driving the shaft in the driving direction, a one-way clutch mechanism may be used to prevent the shaft also driving the motor.

It will be appreciated that at least one of the motor and the mechanical energy provider may be connected to the drive-shaft via a gearbox.

At least one of the motor and mechanical energy provider may be configured to provide torque to the drive-shaft via at least one of: a belt transmission; a chain and gear transmission, a cogwheel transmission.

The system may be configured such that the motor is configured to provide sufficient torque to maintain a predetermined rotation speed of the drive-shaft to generate a predetermined level of electrical power for the facility.

The motor may be configured to supplement any torque provided to the drive-shaft by the mechanical energy provider to enable the generator to provide a particular level of electrical power for the facility.

The intermittent local power source may be one or more of: a wind power source, a hydropower source, a wave power source, a biomass power source, a bio-fuel power source, a geothermal power source.

The intermittent local power source may comprise an apparatus configured to generate mechanical energy from the movement of vehicles or pedestrians.

The intermittent local power source may comprise a renewable power source.

The mechanical energy provider may be configured to be located in the locality of the facility.

At least one of the intermittent local power source and the motor may connected to the generator drive-shaft via a transmission system, the at least one transmission system configured such that the rotation speed of the generator drive-shaft such that rotation speed of the generator drive-shaft is greater when driven by the intermittent local power source than when driven by the motor.

The system may be configured to adjust the speed of the motor in response to detecting a change in the level of power required by the facility.

The system may be configured to provide power to the facility directly from a primary electrical power source in response to detecting by suitable detection (e.g. a motion or torque sensor) means that the intermittent power supply has been inactive for a time period exceeding a predetermined threshold.

The system is configured such that the motor and the mechanical energy provider can provide torque to the drive-shaft simultaneously.

The mechanical energy provider may comprise a mechanical energy provider shaft, the mechanical energy provider shaft being connected to the generator drive-shaft via a transmission system, wherein the transmission system is configured to change the input-output ratio (e.g. gear ratio) in response to changes in at least one of: the speed of the mechanical energy provider shaft; and the output from the intermittent local power source. That is, the transmission system may be configured to adjust the relative rotation speed between a shaft of the mechanical energy provider and the generator drive-shaft, for example, to provide a more constant generator drive-shaft speed (e.g. to compensate for changes in the mechanical energy provider shaft speed). The system may be configured to measure the speed of the mechanical energy provider shaft directly (e.g. using a motion sensor) and adjust the input-output ratio accordingly. The system may be configured to measure or estimate the output from the intermittent local power source (e.g. by measuring the speed of vehicles approaching an apparatus configured to generate mechanical energy from the movement of vehicles) and adjust the input-output ratio accordingly.

The intermittent local power source may be located in the locality of the facility.

The power provided by the first power supply may be generated at a location remote from the facility.

The facility may comprise one or more of: a building, collection of buildings, one or more areas of one or more buildings, a traffic sign or a set of traffic signs, a traffic light or a set of traffic lights, and a kiosk.

According to a further aspect, there is provided a method, the method comprising:
  using a generator configured to generate electrical power for the facility when a drive-shaft of the generator is rotated;
  using a motor configured to provide torque to rotate the generator drive-shaft, the motor configured to be driven by a first power supply; and
  using a mechanical energy provider, configured to provide torque to the drive-shaft using mechanical energy generated from an intermittent local power source, and wherein the system is configured to defer to the mechanical energy provider to rotate the drive-shaft such that, when the intermittent local power source is active, less power is needed from the first power supply to power the motor than when the intermittent local power source is inactive.

The steps of any method disclosed herein do not have to be performed in the exact order disclosed, unless explicitly stated or understood by the skilled person.

The above summary is intended to be merely exemplary and non-limiting.

BRIEF DESCRIPTION OF THE FIGURES

A description is now given, by way of example only, with reference to the accompanying drawings, in which.

DESCRIPTION OF SPECIFIC ASPECTS/EMBODIMENTS

It is becoming more common for facilities (e.g. a home, a small business or community) to use microgeneration for the (small-scale) generation of electric power to meet their own needs, as alternatives or supplements to traditional centralized grid-connected power. This may be motivated by practical considerations (e.g. as the electricity may be cheaper to produce locally), or by environmental concerns (e.g. to lower carbon emissions).

However, it is known that many alternative energy sources (including renewable energy sources such as wind and wave power) may be intermittent or unreliable in practice. In contrast, the demand for electricity may be relatively constant. The problem of matching electrical supply and demand is particularly acute when relying on a relatively small number of generators (e.g. a small number of wind turbines).

Embodiments of the present disclosure provides a system for providing electrical power to a facility, the system comprising:
  a generator configured to generate electrical power for the facility when a drive-shaft of the generator is rotated;
  a motor configured to provide torque to rotate the generator drive-shaft, the motor configured to be driven by a first power supply; and
  a mechanical energy provider, configured to provide torque to the drive-shaft using mechanical energy generated from an intermittent local power source, and wherein the system is configured to defer to the mechanical energy provider to rotate the drive-shaft such that, when the intermittent local power source is active, less power is needed from the first power supply to power the motor than when the intermittent local power source is inactive.

This system may help overcome the mismatch between the demand and the power available from the local power source. For example, such an apparatus would enable the motor to provide power when the intermittent power source was inactive. Because both the motor and the intermittent power source are configured to drive the drive-shaft of the generator, certain embodiments of the system can allow the driving torque to be appropriately switched between the motor and the intermittent power source very rapidly (e.g. almost instantly or in timescales in the order of milliseconds). Particularly for embodiments configured to provide large amounts of electrical power (e.g. providing a current of approximately 55-80 amperes at 240-250V AC), allowing a rapid switching between different power sources may enable the power harvested from the intermittent power source to be maximised (e.g. particularly when the intermittent local power source is active only for short periods of time).

Such a system may also provide an easy way of deriving energy from a plurality of energy sources simultaneously. That is, the intermittent power source and the motor can both be providing torque to the drive-shaft at the same time.

Driving the generator using a motor when the intermittent power source is inactive (or only providing a portion of the necessary torque) allows the generator to continue rotating. Therefore the system allows the inertia of the rotating generator to be maintained when the intermittent power source is inactive. This may help improve the efficiency of the generator (which may need to run at a constant speed to give a constant and known output). By having the system running at speed already the advantage is that no system inertia must be overcome to get the generator up to the required output speed.

Other embodiments depicted in the figures have been provided with reference numerals that correspond to similar features of earlier described embodiments. For example, feature number 1 can also correspond to numbers 101, 201, 301 etc. These numbered features may appear in the figures but may not have been directly referred to within the description of these particular embodiments. These have still been provided in the figures to aid understanding of the further embodiments, particularly in relation to the features of similar earlier described embodiments.

Figure 1A:
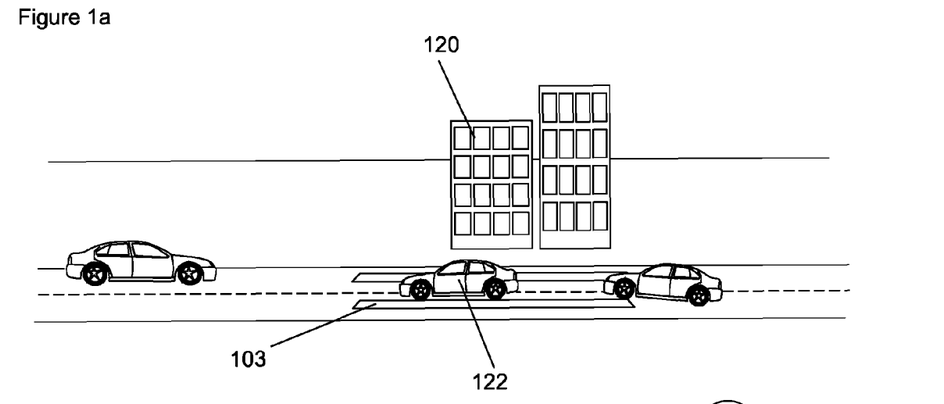
FIGS. 1a-1c depict a system configured to provide electrical power to an office block facility.

FIG. 1a depicts a facility 120 (which in this case comprises office blocks), and a mechanical power provider apparatus configured to generate mechanical energy from the movement of vehicles 122. The mechanical power provider apparatus 103 is connected to a system for providing electrical power to the facility 120.

The mechanical power provider apparatus 103, in this case, comprises a shaft; an active element (e.g. a lever—not shown), the active element being configured to be deflectable from this non-activated position to an activated position by vehicle wheels; wherein the active element is configured to rotate the shaft when moved from the non-activated position to an activated position, thereby providing mechanical power. Such apparatus are described in GB patent application, GB 2,487,680. The rotation of the shaft of the apparatus is used to generate electricity which is transmitted via electrical wires to provide electrical power to the facility.

In this case, the mechanical energy provider apparatus and the intermittent local power source are be configured to be located in the locality of the facility.

It will be appreciated that, in other embodiments, the power generated by the system may be used to power facilities comprising, for example, one or more of: a building, collection of buildings, one or more areas of one or more buildings (e.g. floors or defined office suites, e.g. if multiple different office suites of different companies are in one building), a traffic sign or a set of traffic signs, a traffic light or a set of traffic lights, and a kiosk.

In this case the system 100 (shown in FIG. 1*b*) encompasses the mechanical power provider apparatus 103 housing, and is for providing electrical power to a facility, the system 100 comprising:
- a generator 102 configured to generate electrical power for the facility 120 when a drive-shaft 104 of the generator is rotated;
- a motor 101 configured to provide torque to rotate the generator drive-shaft 104, the motor configured to be driven by a first power supply 121; and
- a mechanical energy provider (which in this case is the mechanical power provider apparatus 103), configured to provide torque to the drive-shaft 104 using mechanical energy generated from an intermittent local power source (which in this case is the cars 122 driving over the apparatus), and wherein the system is configured to defer to the mechanical energy provider 103 to rotate the drive-shaft 104 such that, when the intermittent local power source 103 is active, less power is needed from the first power supply 121 to power the motor 101 than when the intermittent local power source 103 is inactive.

Figure 1B:
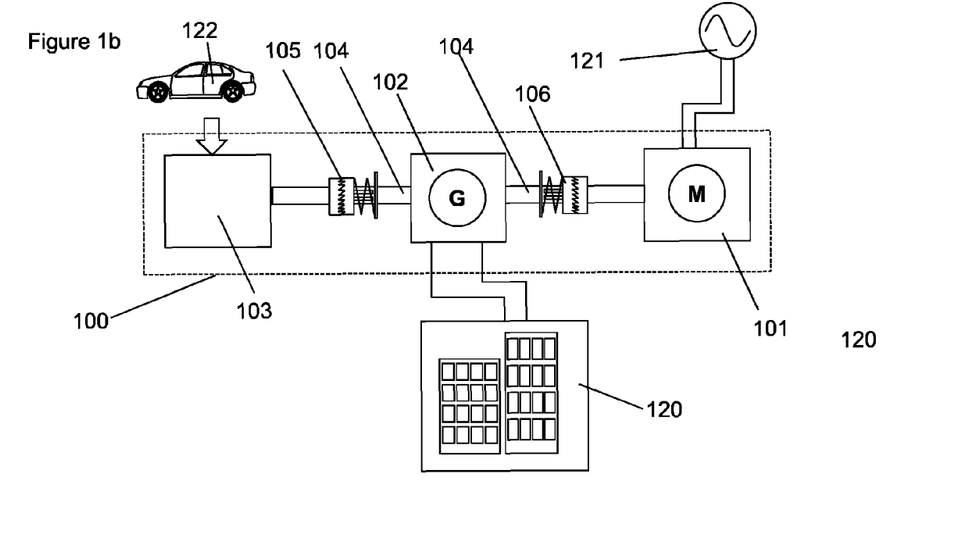

In this case the motor 101 is an electrical motor powered by the mains electricity 121 (a first power supply). It will be appreciated that, in other embodiments, the motor may be powered by a combustible fuel source. In this case, the motor 101 is configured to provide torque to the drive-shaft via a co-axial one-way clutch 106 (in this case a jaw clutch). The power provided by the first power supply is, in this case, generated at a location remote from the facility (e.g. at a remote power plant).

In this case, the motor 101 is connected to the drive-shaft of the generator by a one-way clutch mechanism 106, the (motor) one-way clutch mechanism being configured: to enable the motor 101 to rotate the generator drive-shaft 104 in a driving direction, and to inhibit the motor 101 from being driven by the drive-shaft 104 when the drive-shaft 104 is being rotated by, for example, the mechanical energy provider 103 in the driving direction.

In this case, the mechanical energy provider is powered by the vehicles 122 driving over the apparatus. It will be appreciated that, in other example embodiments, the intermittent local power source may be one or more of: a wind power source, a hydropower source, a wave power source, a biomass power source, a bio-fuel power source, a geo-thermal power source, and a wave power source; or may be powered by pedestrians.

In this case, the mechanical energy provider 103 is connected to the drive-shaft of the generator by a (mechanical energy provider) one-way clutch mechanism 105 (in this case a jaw clutch), the (mechanical energy provider) one-way clutch mechanism 105 being configured: to enable the mechanical energy provider to rotate the generator drive-shaft 104 in a driving direction, and to inhibit the mechanical energy provider from being driven by the drive-shaft 104 when the drive-shaft is being rotated by, for example, the motor 101 in the driving direction.

By using one-way clutch mechanisms in this way, the torque provided by the motor and/or the mechanical energy provided can be more efficiently used to rotate the generator, as less torque is wasted in rotating components of motor and/or mechanical energy provider which are not driving the generator. It will be appreciated that, in some embodiments, only the mechanical energy provider is connected to the generator drive-shaft via a one-way clutch mechanism. This would prevent the motor driving the mechanical energy provider 103, when the intermittent power supply was inactive.

In this case, the motor and the mechanical energy provider one-way clutch mechanisms are each provided by the respective motor and mechanical energy gears which are connected to the drive-shaft being a ratchet gear. It will be appreciated that, in other embodiments, different transmissions and/or different one-way clutch mechanisms may be used to connect the mechanical energy provider and the motor to the generator drive-shaft.

In this case, the system is configured such that the motor is configured to provide sufficient torque to maintain a predetermined rotation speed of the drive-shaft to generate a predetermined level of electrical power for the facility.

By driving the system with a constant speed synchronous motor with a known output torque, the system is already up to speed for periods when the intermittent power source 103 is activated (e.g. when cars are driving over the apparatus to provide the intermittent local power, in this case).

During periods when the mechanical energy provider apparatus 103 is activated then this takes the load off the motor 101 but still allows it to drive at the normal speed. That is, when the mechanical power source is activated and providing all of the required torque to maintain the required rotation speed, the motor is quickly placed in no load condition and during this period only the no-load current is drawn (e.g. 3-5 amps for a 30 amp full load motor).

In this case, the motor 101 is configured to supplement any torque provided to the drive-shaft by the mechanical energy provider to enable the generator to provide a particular level of electrical power. For example, at times when the wind turbine 103 was providing three quarters of the torque required, the motor would provide the remaining quarter of the required torque. Supplementing the torque by the motor may allow the windmill to be used to harvest power when the intermittent power supply is supplying relatively small amounts of power.

Figure 1C:
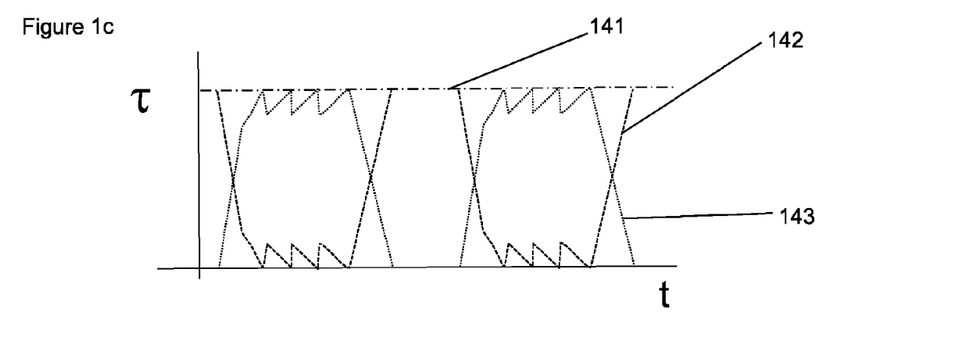

FIG. 1*c* shows the torque provided to the drive-shaft of the generator by the rotor mechanical power source 143; and by the motor 142. The total torque 141 provided by the mechanical power source and the motor is also shown in FIG. 1c. The graph of the power provided by the mechanical power source and the motor for a particular constant output power will have the same form.

It will be appreciated that, in some embodiments, the system may comprise a meter configured to measure the power supplied to the motor by the first power supply.

Figure 2A:
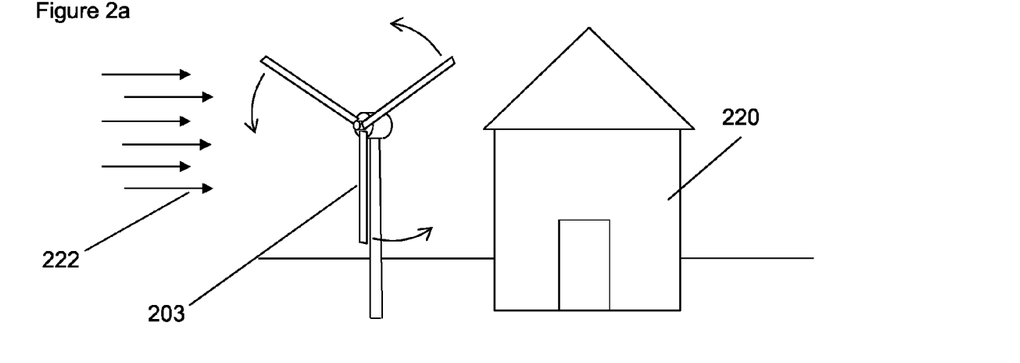
FIGS. 2a-2c depict a system configured to provide electrical power to a facility comprising a house.

FIG. 2a depicts a facility 220 (which in this case is a house), and a wind turbine 203 comprising an embodiment of a system (not shown in FIG. 2a) for providing electricity to the facility 220. The wind turbine comprises a rotor mechanical energy provider configured to rotate when the wind blows 222 through the rotor. This rotation is used to generate electricity which is transmitted via electrical wires to provide electrical power to the facility 220.

In this case, mechanical energy provider rotor 203 and the intermittent local wind power source 222 are configured to be located in the locality of the facility.

It will be appreciated that the power generated by the system may be used to power facilities comprising, for example, one or more of: a building, collection of buildings, one or more areas of one or more buildings (e.g. floors or defined office suites, e.g. if multiple different office suites of different companies are in one building), a traffic sign or a set of traffic signs, a traffic light or a set of traffic lights, and a kiosk.

In this case the wind turbine housing encloses a system (shown in FIG. 2b) for providing electrical power to a facility, the system comprising:
  a generator 202 configured to generate electrical power for the facility 220 when a drive-shaft 204 of the generator 202 is rotated;
  a motor 201 configured to provide torque to rotate the generator drive-shaft 204, the motor 201 configured to be driven by a first power supply 221; and
  a mechanical energy provider 203 (which in this case is the rotor), configured to provide torque to the generator drive-shaft 204 using mechanical energy generated from an intermittent local power source 222 (which in this case is the wind), and wherein the system is configured to defer to the mechanical energy provider 203 to rotate the drive-shaft such that, when the intermittent local power 222 source is active, less power is needed from the first power supply 221 to power the motor 201 than when the local power source 222 is inactive.

Figure 2B:
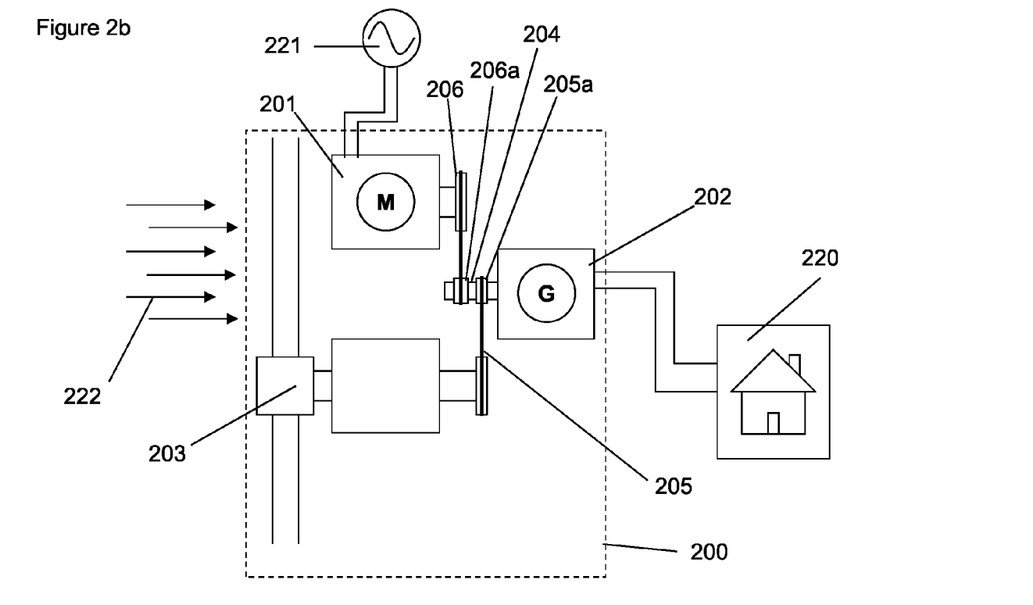

In this case the motor 201 is an electrical motor powered by the mains electricity 221 (a first power supply). In this case, the motor 201 is configured to provide torque to the drive-shaft via a chain and gear transmission 206. The power provided by the first power supply 221 is, in this case, generated at a location remote from the facility (e.g. at a remote power plant).

In this case, the motor 201 is connected to the drive-shaft 204 of the generator 202 by a one-way clutch mechanism 206a (in this case located on the gear of the generator drive-shaft), the (motor) one-way clutch mechanism 206a being configured: to enable the motor 201 to rotate the generator drive-shaft 204 in a driving direction, and to inhibit the motor 201 from being driven by the generator drive-shaft 204 when the generator drive-shaft 204 is being rotated by, for example, the mechanical energy provider 202 in the driving direction.

In this case, the mechanical energy provider 203 is powered by the wind 222. It will be appreciated that, in other example embodiments, the intermittent local power source may be one or more of: a wind power source, a hydropower source, a wave power source, a biomass power source, a bio-fuel power source, a geothermal power source.

In this case, the mechanical energy provider is configured to provide torque to the generator drive-shaft by a separate gear and chain transmission. It will be appreciated that other transmissions may be used (e.g. cog transmissions, belt transmissions etc.).

In this case, the mechanical energy provider is connected to the drive-shaft 204 of the generator 202 by a (mechanical energy provider) one-way clutch mechanism 205a, the (mechanical energy provider) one-way clutch mechanism 205a being configured: to enable the mechanical energy provider 203 to rotate the generator drive-shaft 204 in a driving direction, and to inhibit the mechanical energy provider 203 from being driven by the drive-shaft 204 when the drive-shaft 204 is being rotated by, for example, the motor 201 in the driving direction (and the intermittent local power source is inactive). In this case, the one-way clutch mechanism comprises a ratchet gear located on the generator drive-shaft 204.

In this case, the system is configured such that the motor 201 is configured to provide sufficient torque to maintain a predetermined rotation speed of the drive-shaft to generate a predetermined level of electrical power for the facility.

By driving the system with a constant-speed synchronous motor with a known output torque, the system is already up to speed for periods when the intermittent power source 222 is activated (e.g. when the wind blows in this case).

This type of efficient motor works best when a constant speed and torque is required. That is, when there is no load on the motor then the windings are energised efficiently. For example, a typical 30 amp motor at full load torque uses 30 amps but at no load (e.g. when the mechanical power source is driving the generator) the amp usage is between 3-4 amps. That is, the current drawn is around 15% of the current required at maximum load.

During periods when the wind intermittent power source is activated, the load on the motor is reduced, whilst still allowing the motor to drive at the normal speed. That is, when the mechanical power source is activate and providing all of the required torque to maintain the required rotation speed, the motor is quickly placed in no load condition and during this period only the no-load current is drawn (e.g. 3-5 amps for a 30 amp full load motor).

In this case, the motor is configured to supplement any torque provided to the drive-shaft by the mechanical energy provider to enable the generator to provide a particular level of electrical power. For example, at times when the wind turbine was providing three quarters of the torque required, the motor would provide the remaining quarter of the required torque.

Figure 2C:
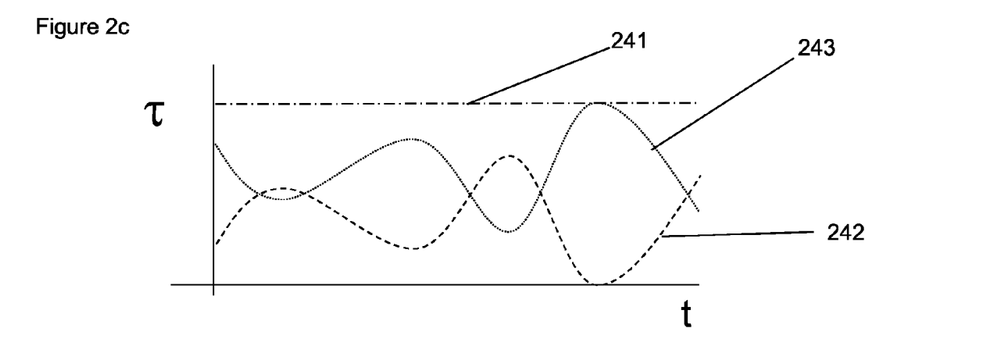

FIG. 2c shows the torque provided to the drive-shaft of the generator by the rotor mechanical power source 243; by the motor 242. The total torque 241 provided by the mechanical power source and the motor is also shown in FIG. 2c.

Figure 3:
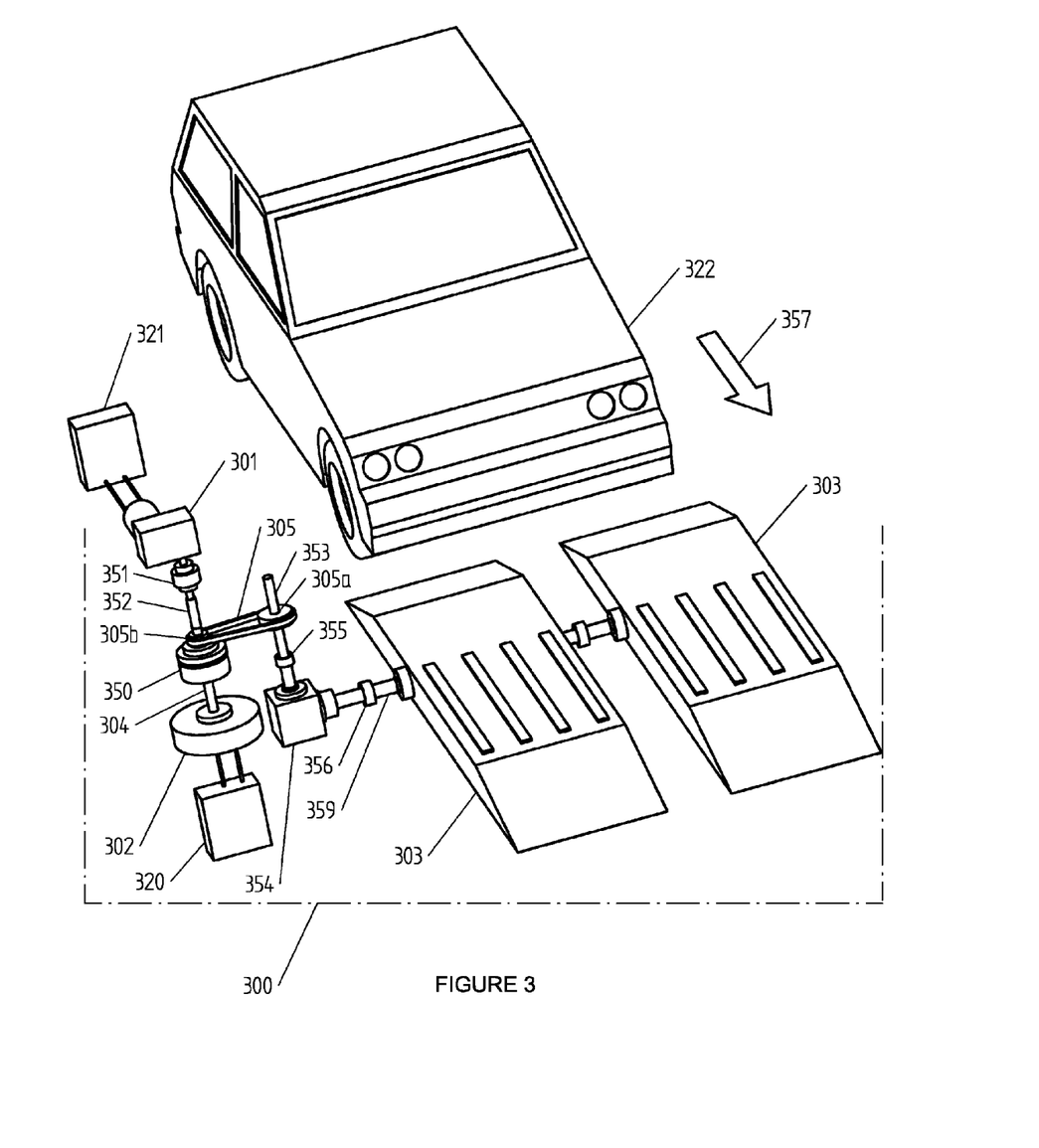
FIG. 3 depicts a system configured to provide electrical power to a facility.

FIG. 3 shows an embodiment of a system 300 comprising: a generator 302 configured to generate electrical power for the facility when a drive-shaft of the generator is rotated; a motor 301 configured to provide torque to rotate the generator drive-shaft 304, the motor configured to be driven by a first power supply 321; and a mechanical energy provider apparatus 303, configured to provide torque to the drive-shaft 304 using mechanical energy generated from an intermittent local power source, and wherein the system is configured to defer to the mechanical energy provider to rotate the drive-shaft such that, when the intermittent local power source is active, less power is needed from the first power supply to power the motor than when the intermittent local power source is inactive.

In this case, the mechanical power provider apparatus 303 configured to ultimately generate electrical power from the movement of vehicles 322. The mechanical power provider apparatus 303, in this case, comprises a shaft; an active element (e.g. a lever—not shown), the active element being configured to be deflectable from this non-activated position to an activated position by vehicle wheels; wherein the active element is configured to rotate the shaft when moved from the non-activated position to an activated position, thereby providing mechanical power. Such apparatus are described in GB patent application, GB 2,487,680. The rotation of the shaft of the apparatus is used to generate electricity (using the generator) which is transmitted via electrical wires to provide electrical power to the facility 320.

The mechanical power provider 303, in this case, provides a relatively constant value of torque to operate the generator 302. The torque required to excite the windings within the operating speed range of the generator 302 should be in the range of around +/−20% from a nominal torque value, wherein the nominal torque value is defined by the generator size. The speed of rotation dictates the power output. For example a typical generator running at 800 rpm with a torque input of around 235 Nm would generate around 18 kW of power, whereas the same generator running at 400 rpm still requires around 235 Nm of torque but would generate around 8.5 kW of power. Likewise, the same generator running at 220 rpm would still require around 235 Nm of torque but would generate 4.2 kW of power.

The mechanical power provider apparatus 303 is configured to provide a value of torque matched to the generator size 302 (e.g. by appropriately configuring the levers and/or gearing mechanism). The speed may be variable because of differences in the speed of activation by the vehicles 322 travelling in the direction of arrow 357.

In this case, the output shaft 359 of the mechanical power provider apparatus 303 is connected via a suitable coupling 356 to the input shaft of a gearbox 354 (e.g. to change the orientation for convenient mounting within the systems housing 300). It will be appreciated that other example embodiments may not have a gearbox. That is, in other example embodiments, the output shaft of the mechanical power provider may be directly connected to the drive-shaft of the generator.

Bearings required to mount the shafts within the system are not described for clarity purposes but it can be appreciated that they are required to suitably mount and contain the shaft arrangements.

In this case, the output shaft of the gearbox 354 is connected to a transmission shaft 353 via a suitable coupling 355. A suitable transmission is provided such as a chain a sprocket, or belt and pulley or gear system 305 to transmit power from the shaft 353 to the connecting shaft 352 the ratio of which is chosen to be optimum and may be speed increasing or speed decreasing.

The apparatus also comprises a motor 301 powered by a first power supply 321. The motor 301 is configured to provide torque to drive the motor output shaft 352 via a suitable coupling 351 at the required speed (e.g. the speed required to allow the generator to generate a particular power output). The shaft 352 is connected to the generator drive-shaft 304 by a suitable coupling. The shafts are supported suitably in bearings which are not shown for clarity purposes.

The generator 302 is configured to generate electrical power for the facility 320 when the drive-shaft of the generator 304 is rotated (e.g. when rotated by the motor and/or the mechanical energy provider).

In operation the motor 301 is configured to drive the generator 302 at the optimum speed for maximum power output in a constant steady state.

The speed of the vehicle 322 passing over the mechanical power provider apparatus 303 can vary within an expected range. Therefore the transmission system can be configured to adjust for different output speeds within the expected range. For example, the transmission system may be configured accordingly to optimise the speed range with the torque produced such that at the minimum speed of the output shaft 359 of the mechanical power provider apparatus 303, the driving pulley, sprocket or gear 305b to the shaft 352 is slightly faster than the rotation speed of the shaft 352 driven by the motor 301.

In this case, a suitable clutch coupling 350 is mounted on the shafts 352 or 304 and is configured to slip constantly after a torque set point is achieved. The pulley, sprocket or gear 305b is mounted to the clutch 350 which connects transmission of power between the pulley, sprocket or gear 305b and the shaft 352 and allows the speed of the transmission 305 to vary whilst delivering a driving torque to the shaft 352.

If the speed of the vehicle 322 passing over the mechanical power provider apparatus 303 is in the highest of the range that the system is configured to accommodate, then the pulley, sprocket, or gear 305b will be driven faster but with a similar torque and so, as described previously, the power to assist the motor 301 will remain the same because the clutch 350 will slip thus giving the same slipping speed.

Power equals torque multiplied by angular velocity and so when the rotational speed of the transmission 305 is in the lowest range and torque output is fairly constant, then the power offered to assist the motor 301 via the shaft 352 is the lowest of the range.

The system is provided with one way clutch type means 305a so as to allow transmission of torque when rotated in one direction but slip when rotated in the opposite direction. They can be fitted in the transmission shaft 305 or on the output shaft of the mechanical power provider apparatus 303.

The one way clutch allows the drive-shaft and transmission parts to rotate at the speed of the generator 302 whilst the mechanical power provider apparatus 303 is inactive. This may reduce the inertia effects of the system. For example, when a vehicle 322 is providing power to rotate the shaft 359 in a particular direction (e.g. clockwise) then the outer and inner races of the one way clutch bearing means 305a are travelling in the same direction relative to each other and cause power transmission to assist the motor 301 and reduce its electrical energy usage.

In contrast, when the mechanical power provider apparatus 303 is inactive then the outer race of the one way clutch bearing means 305a is stationary but the motor 301 is driving the system including the shaft 359 in the particular direction (e.g. clockwise), and so the inner and outer races of the one way clutch bearing means 305a are rotating relative to each other (e.g. slipping with respect to each other) and therefore no power is transmitted back through to the mechanical power provider apparatus 303.

A feature of this embodiment is that the speed of the final pulley, sprocket or gear 305b in the transmission system 305 from the mechanical power provider apparatus 303 must be equal to or faster than shaft 352 driven by the motor 301 so that drive power is transmitted to make the clutch means 350 slip.

This may be likened to bicycle pedals in that when the bicycle is coasting at speed, the rider can turn the pedals in the driving direction at less speed than the driving speed or keep them stationary and in this case no drive force is transmitted. The rider must pedal faster than the coasting speed to cause engagement of the drive. In this case the rider can be regarded as the clutch as the rider increases or decreases effort accordingly.

In the case of the mechanical power provider apparatus 303 this effort is not reactive and so the apparatus 303 delivers what is invoked by the vehicle to the shaft. This means that, during activation the apparatus may not be adjusted instantaneously, so a clutch means 350 may be used to soak up at least some of surplus energy.

Figure 4A:
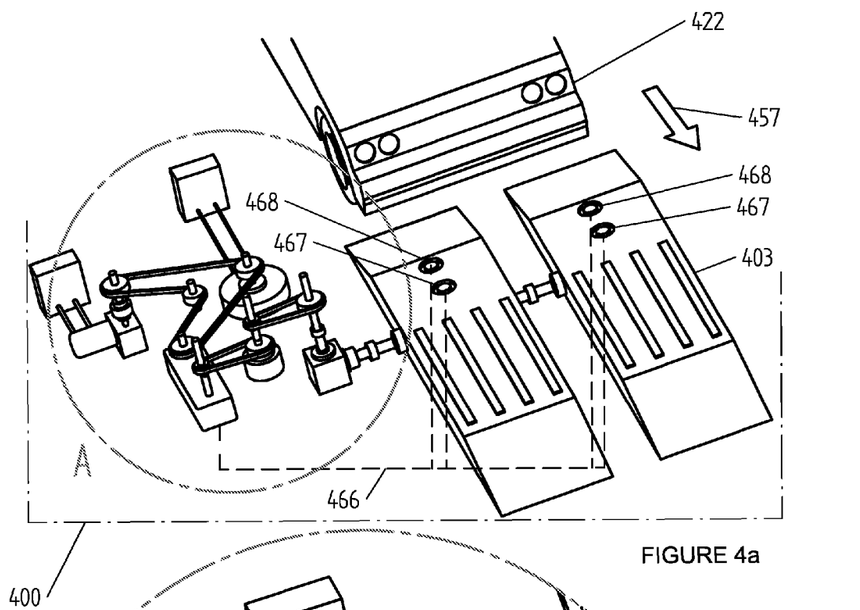
FIGS. 4a-4b depict a system configured to provide electrical power to a facility.
Figure 4B:
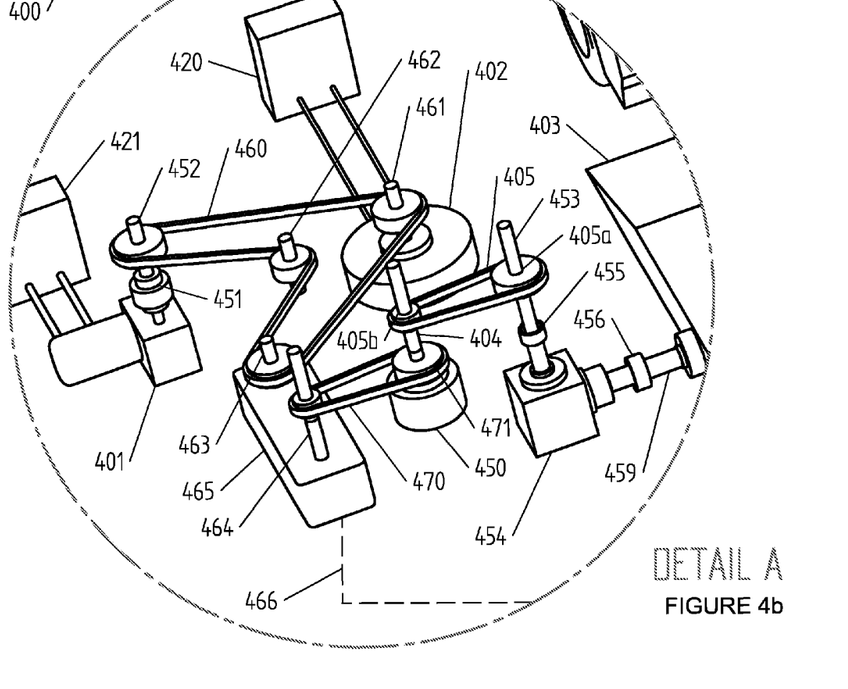

FIG. 4a shows an embodiment of a system 400 enclosing the mechanical power provider apparatus 403 configured to generate electrical power from the movement of vehicles 422. FIG. 4b shows a portion of the system shown in FIG. 4a in more detail.

In this case, the system 400 is for providing electrical power to a facility, and comprises:
- a generator 402 configured to generate electrical power for the facility when a drive-shaft of the generator is rotated;
- a motor 401 configured to provide torque to rotate the generator drive-shaft, the motor configured to be driven by a first power supply 421; and
- a mechanical energy provider 403, configured to provide torque to the drive-shaft using mechanical energy generated from an intermittent local power source, and wherein the system is configured to defer to the mechanical energy provider to rotate the drive-shaft such that, when the intermittent local power source is active, less power is needed from the first power supply to power the motor than when the intermittent local power source is inactive.

The mechanical power provider apparatus 403, in this case, comprises a shaft; an active element (e.g. a lever—not shown), the active element being configured to be deflectable from this non-activated position to an activated position by vehicle wheels; wherein the active element is configured to rotate the shaft when moved from the non-activated position to an activated position, thereby providing mechanical power. Such apparatus are described in GB patent application, GB 2,487,680. The rotation of the shaft of the apparatus is used to generate electricity which is transmitted via electrical wires to provide electrical power to the facility 420.

It is desired that the mechanical power provider 403, in this case provides a relatively constant value of torque to operate the generator 402. The torque required to excite the windings within the operating speed range of the generator 402 does not generally vary from a nominal torque value of around +/−20% where the nominal torque value is defined by the generator size. As described for the previous embodiment, the speed dictates the power output.

The mechanical power provider apparatus 403 is configured to provide a value of torque matched to the generator size 402. The speed may vary in accordance with the speed of activation by the vehicles 422 travelling in the direction of arrow 457.

In this case, the output shaft 459 of the mechanical power provider apparatus 403 is connected via a suitable coupling 456 to the input shaft of a gearbox 454.

Bearings required to mount the shafts within the system are not described for clarity purposes but it can be appreciated that they may be used to suitably mount and contain the shaft arrangements.

The output shaft of the gearbox 454 is connected to the transmission shaft 453 via a suitable coupling 455. A suitable transmission is provided such as a chain a sprocket, or belt and pulley or gear system 405 to transmit power from the shaft 453 to the connecting shaft 404 the ratio of which is chosen to be optimum and may be speed increasing or speed decreasing.

A suitable clutch device 450 is mounted on the shaft 404 and configured to slip constantly after a torque set point is achieved and varied automatically via electrical control. The pulley, sprocket or gear 471 is mounted to the clutch 450 which connects transmission of power between the pulley, sprocket or gear 471 and the shaft 404 and allows the speed of the transmission 405 to vary whilst delivering a driving torque from the shaft 404 to the pulley, sprocket or gear 471. The pulley, sprocket or gear 471 of the transmission system 470 transmits power to the input shaft 464 of a suitable speed variation device 465 which are commercially available and may be of a number of configurations such as cone and ball bearing type or disc type or belt and opposing wedge pulleys. They are available with an input shaft 464 and output shaft 463 with means of automatically or manually adjusting the speed ratio between the two within a range. The adjustment of speed in this case is made by a suitable actuator means such as electric motor which turns the speed variation shaft upon demand to a required setting and is generalised as a reactive actuator system 466.

The ratios of the transmission systems 405 and 470 may increase or decrease the speed to suit the speed variation device 465. Suitable detection switch means 467 and 468 are provided as part of the reactive actuator system 466 where the speed of the approaching vehicle 422 is determined on a priming zone using the time between to operate the switch means 467 and 468 prior to the vehicle reaching the mechanical power provider apparatus 403 and the system 466 will set the appropriate ratio to match the output speed of the shaft 463 of the speed variation device 465 with the speed of the input shaft 461 of the generator.

The transmission system 460 such as chain and sprocket or belt and pulley or gear set connects the shafts 461, 452 and 463 to drive together. An idler shaft and pulley 462 is included to obtain the required chain or belt path.

The first power supply 421 provides power to the motor 401 configured to provide torque to drive the shaft 452 via a suitable coupling 451 in turn to transmit power through the transmission system 460 at the required speed. The shaft 452 is supported suitably in bearings all of which are not shown for clarity purposes.

The generator 402 is configured to generate electrical power for the facility 420 when the drive-shaft of the generator 461 is rotated.

In normal operation the motor 401 drives the generator 402 at the optimum speed for maximum power output in a constant steady state.

The speed of the vehicle 422 passing over the mechanical power provider apparatus 403 can vary within an expected range and so the transmission system is configured accordingly to optimise the speed range with the torque produced such that at the minimum speed of the output shaft 459 of the mechanical power provider apparatus 403, the driving pulley, sprocket or gear 405b to the shaft 404 is slightly faster than the rotation speed of the pulley, sprocket or gear 471 driven by the motor 401.

If the speed of the vehicle 422 passing over the mechanical power provider apparatus 403 is in the highest of the range that the system is configured to accommodate, then the detection means 467 and 468 will cause the reactive actuator system 466 to adjust the speed ratio such that the pulley, sprocket, or gear 405b will be driven slightly faster but with a similar torque and so, the power to assist the motor 401 will be optimum because the clutch 450 will slip thus giving the same slipping speed and the surplus energy is minimised.

The clutch means 450 can be mounted alternatively on the input shaft 464 or the output shaft 463 of the speed variation device 465

The system is provided with one way clutch type means 405a so as to allow transmission of torque when rotated in one direction but slip when rotated in the opposite. They can be fitted in the transmission system 405 or on the output shaft of the mechanical power provider apparatus 403 or in other shaft locations depending on the mounting location of the clutch means 450 as they need to be between the clutch means 450 and the mechanical power provider apparatus 403 and their purpose is to allow the drive-shaft and transmission parts to rotate at the speed of the generator 402 whilst the mechanical power provider apparatus 403 is inactive to reduce the inertia effects of the system.

For example, if mounted on the output shaft 459 of the mechanical power provider apparatus 403 then when activated by a vehicle 422 power is transmitted to rotate the shaft 459 say, clockwise then the outer and inner races of the one way clutch bearing means 405a are travelling in the same direction relative to each other and cause power transmission to assist the motor 401 and reduce its electrical energy usage.

When the mechanical power provider apparatus 403 is inactive then the outer race of the one way clutch bearing means 405a is being driven by the motor 401 whilst the shaft 459 is stationary, and so the inner and outer races of the one way clutch bearing means 405a are travelling in the opposite direction relative to each other for which in this case are configured to slip and therefore no power is transmitted back through to the mechanical power provider apparatus 403.

A feature of this embodiment is that the speed of the final pulley, sprocket or gear 405b in the transmission system 405 from the mechanical power provider apparatus 403 must be equal to or faster than shaft 404 driven by the motor 401 so that drive power is transmitted to make the clutch means 450 slip.

In the case of the mechanical power provider apparatus 403, this effort is not reactive and delivers what is invoked by the vehicle regardless and during activation cannot be adjusted instantaneously and so a clutch means 450 is required to soak up the surplus energy.

It may be beneficial to size the power output of such systems (as are described above) to the usage requirements of the facility. It is expected that a primary conventional electrical power source may remain or be installed to meet the full requirements as normal in the event of failure of the system 100, 200, 300, 400. There may be safety mechanisms in this case. For example, if the mechanical power provider apparatus 103, 203, 303, 403 fails then a clutch means may disengage and the motor may be switched out and the power facility would revert back to receiving electrical power directly from the primary power source (e.g. instantaneously or as quickly as possible) as there may be no benefit in driving the motor 101, 201, 301, 401 to drive the generator 102, 202, 302, 402 without any assistance from the mechanical power provider apparatus 303. The clutch means 350 would be disengaged to prevent the mechanical power provider apparatus 103, 203, 303, 403 from transmitting power to drive the stationary motor 101, 201, 301, 401 and generator 302. The system and the primary power source would connect to a suitable unit capable of harmonising two separate sources of incoming electrical power supplies into one common output supply to power the facility.

In one mode of operation the speed of the motor 101, 201, 301, 401 will be adjusted accordingly to give an output power below the power requirement of the facility so that the situation is such that the maximum output of the system 100, 200, 300, 400 is equivalent to the minimum of the peaks and troughs of the fluctuating power consumption of the facility. In this way surplus energy will not have to be suitably dissipated by the system 100, 200, 300, 400 as this will be done within the primary power source supply (e.g. the national grid).

For example, if the system 100, 200, 300, 400 is set to deliver the maximum that the facility demands then if half the appliances are turned off then the system must dissipate the surplus power.

In a second mode of operation, the system will react accordingly to follow the peaks and troughs of the power demands of the facility by speeding up and slowing down the motor accordingly.

In a third mode of operation the system will revert automatically to switch the supply to the facility to the primary power source if it is detected by suitable detection means within the system that no vehicles have passed over the mechanical power provider apparatus for a set time period and similarly switch the system to be active when a vehicle is detected on the approach.

It will be appreciated that the apparatus described above may provide an easy way of deriving energy from a plurality of energy sources simultaneously. For example, the intermittent power source (or sources) and the motor can both be providing torque to the generator drive-shaft at the same time.

The invention claimed is:

1. A system for providing electrical power to a facility, the system comprising:
   a generator configured to generate electrical power for the facility when a drive-shaft of the generator is rotated;
   a constant speed synchronous motor configured to be driven by a first power supply to provide through a motor output shaft sufficient torque to rotate the generator drive-shaft at a predetermined speed to generate a predetermined level of electrical power for the facility; and
   a mechanical energy provider, configured to provide torque through a mechanical energy provider output shaft to the generator drive-shaft using mechanical energy generated from an intermittent local power source,
   wherein the system is configured to defer to the mechanical energy provider to rotate the generator drive-shaft by the mechanical energy provider output shaft being connected to either the generator drive-shaft or the motor output shaft via a clutch coupling: the clutch coupling being configured to slip above a set slipping torque such that, when the intermittent local power source is active, the torque provided by the mechanical energy provider is greater than the set slipping torque, and the mechanical energy provider output shaft rotates at a faster rate than a respective one of the generator drive-shaft and the motor output shaft to which the mechanical energy provider output shaft is connected to reduce torque required from the motor to rotate the generator drive-shaft at the predetermined speed, with less power being needed from the first power supply to power the motor than when the intermittent local power source is inactive.

2. The system of claim 1, wherein the first power supply is an electrical power supply.

3. The system of claim 1, wherein the first power supply is a household A/C electrical power supply.

4. The system of claim 1, wherein the mechanical energy provider is connected to the generator drive-shaft by a one-way clutch mechanism
configured:
to enable the mechanical energy provider to rotate the generator drive-shaft in a driving direction, and
to inhibit the mechanical energy provider from being driven by the generator drive-shaft when the generator drive-shaft is being rotated by the motor in the driving direction.

5. The system of claim 1, wherein at least one of the motor and mechanical energy provider is configured to provide torque to the generator drive-shaft via at least one of: a belt transmission; a chain and gear transmission, a cogwheel transmission.

6. The system of claim 1, wherein the motor is configured to supplement torque provided to the generator drive-shaft by the mechanical energy provider to enable the generator to provide a particular level of electrical power for the facility.

7. The system of claim 1, wherein the intermittent local power source is one or more of: a wind power source, a hydropower source, a wave power source, a biomass power source, a bio-fuel power source, a geothermal power source.

8. The system of claim 1, wherein the intermittent local power source comprises an apparatus configured to generate mechanical energy from the movement of vehicles or pedestrians.

9. The system of claim 1, wherein the intermittent local power source comprises a renewable power source.

10. The system of claim 1, wherein the mechanical energy provider is configured to be located in the locality of the facility.

11. The system of claim 1, wherein the intermittent local power source is located in the locality of the facility.

12. The system of claim 1, wherein the power provided by the first power supply is generated at a location remote from the facility.

13. The system of claim 1, wherein the system is configured to provide power to the facility directly from a primary electrical power source in response to detecting by suitable detection means that the intermittent power supply has been inactive for a time period exceeding a predetermined threshold.

14. The system of claim 1, wherein the system is configured such that the motor and the mechanical energy provider can provide torque to the generator drive-shaft simultaneously.

15. The system of claim 1, wherein the facility comprises one or more of: a building, collection of buildings, one or more areas of one or more buildings, a traffic sign or a set of traffic signs, a traffic light or a set of traffic lights, and a kiosk.

16. A method, the method comprising:
using a generator configured to generate electrical power for the facility when a drive-shaft of the generator is rotated;
using a constant speed synchronous motor configured to be driven by a first power supply to provide through a motor output shaft sufficient torque to rotate the generator drive-shaft at a predetermined speed to generate a predetermined level of electrical power for the; and
using a mechanical energy provider, configured to provide torque through a mechanical energy provider output shaft, to the generator drive-shaft using mechanical energy generated from an intermittent local power source,
wherein the system is configured to defer to the mechanical energy provider to rotate the generator drive-shaft by the mechanical energy provider output shaft being connected to either the generator drive-shaft or the motor output shaft via a clutch coupling, the clutch coupling being configured to slip above a set slipping torque such that, when the intermittent local power source is active, the torque provided by mechanical energy provider is greater than the set slipping torque and the mechanical energy provider output shaft rotates at a faster rate than a respective one of the generator drive-shaft and the motor output shaft to which the mechanical energy provider output shaft is connected, to reduce torque required from the motor to rotate the generator drive-shaft at the predetermined speed with less power being needed from the first power supply to power the motor than when the intermittent local power source is inactive.

* * * * *